US 10,445,952 B2

(12) United States Patent
Voigt et al.

(10) Patent No.: US 10,445,952 B2
(45) Date of Patent: Oct. 15, 2019

(54) MOTOR VEHICLE HAVING A COMMUNICATION UNIT FOR MULTIPLE CONTROL UNITS

(71) Applicant: AUDI AG, Ingolstadt (DE)

(72) Inventors: Christoph Voigt, Großmehring (DE); Stefan Volnhals, Adelschlag (DE); Gerald Stöckl, München (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/082,605

(22) PCT Filed: Mar. 2, 2017

(86) PCT No.: PCT/EP2017/054884
§ 371 (c)(1),
(2) Date: Sep. 6, 2018

(87) PCT Pub. No.: WO2017/153240
PCT Pub. Date: Sep. 14, 2017

(65) Prior Publication Data
US 2019/0073840 A1 Mar. 7, 2019

(30) Foreign Application Priority Data
Mar. 11, 2016 (DE) .................. 10 2016 002 945

(51) Int. Cl.
*G07C 5/00* (2006.01)
*H04W 4/024* (2018.01)
(Continued)

(52) U.S. Cl.
CPC ............ *G07C 5/008* (2013.01); *B60R 16/023* (2013.01); *H04L 67/12* (2013.01); *H04W 4/024* (2018.02); *H04W 4/40* (2018.02); *H04W 4/46* (2018.02)

(58) Field of Classification Search
None
See application file for complete search history.

(56) References Cited

U.S. PATENT DOCUMENTS 9,344,503 B2   5/2016  Stählin et al.
2011/0122858 A1* 5/2011  Yashiro ................. H04W 64/00
                                                       370/338
(Continued)

FOREIGN PATENT DOCUMENTS

CN    102461112 A    5/2012
CN    104718530 A    6/2015
(Continued)

OTHER PUBLICATIONS

Hegde, Rajeshwari, "Load Balancing Across ECUs in Automotives," 2009 International Conference on Communication Software and Networks, Published on Feb. 27, 2009; pp. 404-408.
(Continued)

*Primary Examiner* — Richard M Camby
(74) *Attorney, Agent, or Firm* — Sterne, Kessler, Goldstein & Fox P.L.L.C.

(57) ABSTRACT

The invention relates to a motor vehicle including a communication unit, which includes at least one wireless module and is configured to operate a respective wireless link, by way of the at least one wireless module, to at least one vehicle-external object for exchanging communication data. A plurality of function programs are provided in the motor vehicle, which are each configured to provide a vehicle functionality that is based on the communication data. A plurality of control units are provided, which are different from the communication unit, of which each includes a service module which is configured, independently of the function programs, to exchange the communication data from the respective control unit via the communication unit. The function programs are distributed among the control
(Continued)

units and are configured to exchange the communication data with the respective service module of the control unit.

18 Claims, 1 Drawing Sheet

(51) Int. Cl.
  *H04W 4/46* (2018.01)
  *H04L 29/08* (2006.01)
  *H04W 4/40* (2018.01)
  *B60R 16/023* (2006.01)

(56) References Cited

U.S. PATENT DOCUMENTS

| | | | |
|---|---|---|---|
| 2011/0130905 A1* | 6/2011 | Mayer | G07C 5/008 |
| | | | 701/22 |
| 2014/0143839 A1 | 5/2014 | Ricci | |
| 2015/0172306 A1 | 6/2015 | Kim et al. | |
| 2015/0237561 A1 | 8/2015 | Stählin et al. | |

FOREIGN PATENT DOCUMENTS

| | | |
|---|---|---|
| EP | 1058220 A1 | 12/2000 |
| JP | 2002261790 A | 9/2002 |

OTHER PUBLICATIONS

Neethu, Mary Judy et al., "Development of Communication Manager Module for Automotive Platform Software Based on AUTOSAR 4.0," International Journal of Engineering Research & Technology, vol. 4, Issue 08, Published Aug. 6, 2015; pp. 44-47.

International Search Report and Written Opinion of the International Searching Authority directed to related International Patent Application No. PCT/EP2017/054884, dated Jun. 8, 2017, with attached English-language translation; 30 pages.

International Preliminary Report on Patentability directed to related International Patent Application No. PCT/EP2017/054884, dated Jan. 30, 2018, with attached English-language translation; 16 pages.

* cited by examiner

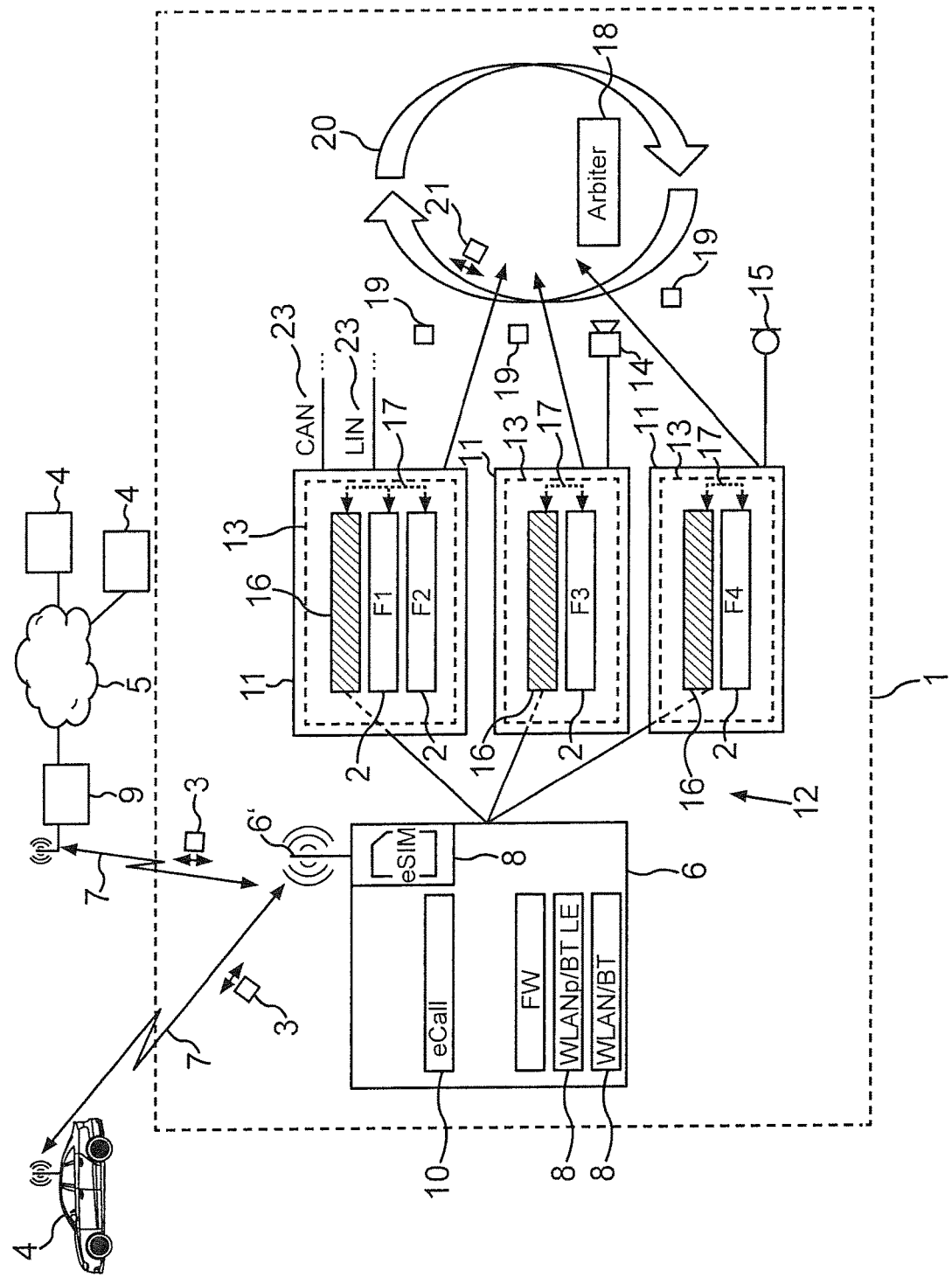

MOTOR VEHICLE HAVING A COMMUNICATION UNIT FOR MULTIPLE CONTROL UNITS

TECHNICAL FIELD

The invention relates to a motor vehicle comprising a communication unit, which includes at least one wireless module for providing or operating a wireless link to at least one vehicle-external object for exchanging communication data. Multiple function programs are provided in the motor vehicle, which each provide a vehicle functionality based on this communication data. The invention furthermore includes a method for providing these vehicle functionalities.

BACKGROUND

In a motor vehicle, what are known as online vehicle functionalities may be provided, which utilize communication data that are received from a vehicle-external object and/or emitted to the vehicle-external object via a wireless link. One example of such a vehicle functionality is car-2-car communication, such as is described, for example, on the website www.car-2-car.org. The car-2-car messages represent the communication data in this instance. Remote maintenance is another vehicle functionality of this kind, in which software updates are transmitted to the motor vehicle via a wireless link and loaded into or stored in a control unit or a control device there. The software update then represents the communication data. Each of these vehicle functionalities can be implemented by a function program.

In today's motor vehicles, it is generally provided to provide these function programs in the communication unit, which also includes the at least one wireless module by way of which the respective wireless link to the at least one vehicle-external object, which is to say another motor vehicle or a mobile communication network, for example, is provided. This has the disadvantage that the number and/or the scope of the function programs is limited by the computing power of the communication unit. On the other hand, providing an additional processor device for executing further function programs creates the problem that the function programs have to be adapted or restructured so as to be able to exchange, from this processor device, communication data with the vehicle-external objects indirectly via the communication unit. This consequently requires an adaptation effort in the function programs.

BRIEF DESCRIPTION OF THE DRAWINGS/FIGURES

FIG. 1 illustrates a schematic representation a motor vehicle, according to some embodiments of this disclosure.

DETAILED DESCRIPTION

It is the object of the invention to operate function programs in a motor vehicle which are dependent on exchanging communication data with vehicle-external objects.

The object is achieved by the subject matter of the independent claims. Advantageous refinements of the invention are disclosed by the features of the dependent claims, the following description, and the figure.

As a result of the invention, a motor vehicle is provided, comprising the described communication unit, which includes at least one wireless module and is configured to operate a respective wireless link, by way of the at least one wireless module, to at least one vehicle-external object so as to exchange communication data therewith. Multiple function programs are provided in the motor vehicle, which are configured to provide a respective vehicle functionality that is based on the communication data, which is to say the emission of communication data to the at least one vehicle-external object and/or the reception of communication data from the at least one vehicle-external object. The vehicle-external object may, in the described manner, be another motor vehicle, for example, or an infrastructure component (which is to say an object fixedly arranged in the road transport infrastructure system, for example a stop light and/or a traffic sign) or a mobile communication network or a Wireless Local Area Network (WLAN) or a server of the Internet. Such a server may represent what is known as a back end, which receives data from multiple motor vehicles and aggregates this, for example, so as to thereby generate a description of the surrounding area or a description of the environment.

So as to render the number and/or the scope of the function programs independent from a computing power of the communication unit, it is provided according to the invention that multiple control units, which are different from the communication unit, are provided (which is to say, for example, further or other control devices), of which each includes a service module. Such a service module may comprise an electronic circuit and/or a program code. Each service module is configured, independently of the function programs, to exchange the communication data, from the respective control unit in which the service module is located via the communication unit and the respective wireless link with the at least one vehicle-external object. A service module thus provides all of those service functions or service functionalities which are required for the actual exchange of the communication data with the at least one vehicle-external object. The function programs are disposed on the control units in a distributed manner and configured to exchange the communication data not themselves with a vehicle-external object, but instead to exchange the communication data only with the respective service module of the control unit. In other words, none of the function programs itself has to be configured to exchange the communication data via the communication unit and a wireless link with the at least one vehicle-external object. Instead, it is provided that each function program only executes or carries out the exchange of the communication data with the respective service module of the control unit thereof.

The operation of the motor vehicle according to the invention yields the following method according to the invention for providing multiple vehicle functionalities that are based on the described communication data, which, in turn, are exchanged with vehicle-external objects. In the motor vehicle, the communication unit operates a respective wireless link to at least one vehicle-external object by way of at least one wireless module. Multiple function programs in each case provide one of the vehicle functionalities, which is to say navigation and/or car-2-X communication, for example. The function programs themselves are distributed among multiple control units, which are different from the communication unit, from where they are executed. The control units operate a respective service module, which, independently from the function programs, exchanges the communication data, from the respective control unit, via the communication unit and the respective wireless link with the at least one vehicle-external object. The function programs themselves exchange the communication data with the respective service module of the control unit. In other words, the function programs only have to be designed to exchange the communication data within the control unit with the service module. The unit-external communication, which is to say from the control unit to the respective vehicle-external object, is carried out or provided by the service module.

The invention yields the advantage that the computing power in the motor vehicle can be adapted by providing an accordingly large number of and/or powerful control units, which are different from the actual communication unit. Nevertheless, none of the function programs has to be adapted to exchange the communication data, from the respective control unit, with the at least one vehicle-external object. The exchange of the communication data may be carried out by the function program with respective local service module provided in the control unit. The actual transmission, which is to say the exchange with the at least one vehicle-external object, is carried out by the service module. It therefore does not matter to the respective function program where it is executed.

The invention also includes optional refinements, the features of which yield additional advantages.

According to one refinement, the service modules of the control units are designed identically. In particular, it is provided that an application interface (application programming interface, API), via which the exchange of the communication data between the service module and a function program is carried out, is designed identically for each of the service modules. In this way, it can then advantageously be freely set or selected on which control unit a function program is installed or provided.

The service modules are preferably configured to carry out an authentication for the function programs with the at least one vehicle-external object and/or an encryption of communication data to be emitted and/or a decryption of received communication data. In this way, the function programs can have a particularly simple design.

So as to prevent having to establish already during the production of the motor vehicle which function program is to be operated in which control unit, it is preferably provided that a respective copy of the same function program is provided in at least two of the control units. The control units are each configured to operate one copy at a time. The vehicle functionality provided by the function program is thus only provided by one copy of the function program at any given point in time. However, it is possible for the same vehicle functionality to be provided by a copy in another control unit at another point in time. In this way, the vehicle functionalities can be shifted in the motor vehicle, which is to say provided in different execution locations.

It is particularly preferred that the control units are configured to carry out a change, which is referred to as a device change here. For the device change, one of the copies of the vehicle program is halted during the ongoing operation of the motor vehicle. A set of parameters is ascertained, which describes a current operating state of the halted copy. The operating state describes the current state of the vehicle functionality. The operating state is set by way of this set of parameters in another copy of the function program, and this copy is put into operation. In other words, this copy of the function program continues where the preceding copy was halted. In this way, a seamless device change from one control unit to another is possible. In the motor vehicle, the vehicle functionality is provided continuously, which is to say without an abrupt change in the operating state.

Preferably, this is used for what is known as load balancing. An arbiter unit is provided, which is configured to ascertain a respective resource utilization of the control units and to equalize the resource utilization levels of the control units by the described device change. For example, the device change may be triggered if a resource utilization of one of the control units is higher than a predetermined threshold value.

The described vehicle functionalities are, in particular, at least one of the following: navigation, voice control, processing of sensor signals, car-2-X communication and/or remote maintenance. The car-2-X communication takes place between the motor vehicle on the one hand, and another vehicle (car-2-car) and/or an infrastructure component on the other hand. An infrastructure component is an object fixedly disposed in the road transport infrastructure system, for example a stop light and/or a traffic sign.

So as to reliably exchange the communication data with the at least one vehicle-external object, it is in particular provided that the at least one wireless module of the communication unit comprises a mobile communication module, for example a Long-Term Evolution (LTE) module and/or a WLAN module and/or a Bluetooth module.

So as to couple the control units comprising the function programs among one another and to the communication unit, it is preferably provided that the communication unit and the control units are coupled to one another via a packet-oriented data network. It is particularly preferred that an Ethernet network, and in particular a Gigabit Ethernet, is provided. A packet-oriented data network has the advantage that the usage of the data network is adapted dynamically and as needed. It is not necessary during the configuration of the motor vehicle to establish fixedly predefined time slots, for example.

The motor vehicle according to the invention is preferably designed as a car, and in particular as a passenger car.

The invention also encompasses refinements of the method according to the invention which include features such as have already been described in connection with the refinements of the motor vehicle according to the invention. For this reason, the corresponding refinements of the method according to the invention are not described again here.

An exemplary embodiment of the invention is described hereafter. For this purpose, FIG. 1 shows a schematic illustration of one exemplary embodiment of the motor vehicle according to the invention.

The exemplary embodiment described hereafter is a preferred embodiment of the invention. In the exemplary embodiment, the described components of the embodiment in each case represent individual features of the invention which are to be considered independently of one another and which also refine the invention independently of one another and, as a result, shall also be considered to be an integral part of the invention, either individually or in a combination other than the one shown. Furthermore, the described embodiment may also be supplemented with other above-described features of the invention.

FIG. 1 illustrates a motor vehicle 1, which may be a car, for example, and in particular a passenger car. Multiple function programs 2 are provided in the motor vehicle 1, which can each be provided by a vehicle functionality F1, F2, F3, F4. The following can be provided as vehicle functionalities F1, F2, F3, F4, for example: remote maintenance of components of the motor vehicle 1, for example the loading of update software, and/or surroundings monitoring based on car-2-X communication and/or the transmission of sensor data and/or online voice recognition and/or online-based voice control. The vehicle functionalities F1 to F4 are based on an exchange of communication data 3 with vehicle-external objects 4, which may be other vehicles and/or one or more servers of the Internet 5, for example.

A communication unit 6 may be provided in the motor vehicle 1 for transmitting the communication data 3 between the objects 4 and the motor vehicle 1. The communication data 3 can be exchanged with the objects 4 via a respective wireless link 7. So as to establish and/or maintain or operate the wireless links 7, the communication unit comprises at least one wireless module 8, for example a mobile communication module, which is able to establish a mobile communication link to a module communication network 9 based on a subscriber identification module (SIM) or embedded SIM (eSIM). It is possible to communicate with servers of the Internet, for example, via the mobile communication network 9. At least one further wireless module may be provided for providing a WLAN connection and/or a Bluetooth connection BT. The WLAN connection to another vehicle may be provided based on the WLANp standard (standard IEEE802.11p) and/or Bluetooth LE (Low Energy). For example, the communication unit 6 can be a control device for an antenna module 6', for example a roof antenna.

The exchange of the communication data 3 via the wireless links 7 can be protected by a firewall protection mechanism FW so as to prevent the motor vehicle 1 from being manipulated from the outside. The communication unit 6 can furthermore comprise an emergency call function 10, which is known per se and is also referred to as eCall.

The function programs 2, in contrast, do not have to be executed by the communication unit 6.

Instead, further control devices or control units 11 can be coupled to the communication unit 6 via a data network 12 in the motor vehicle 1. Each of the control units 11 can comprise a processor unit 13, for example one or more microprocessors or microcontrollers, which can each execute at least one of the function programs 2, so that the respective control unit 11 provides or implements or executes the corresponding vehicle functionality F1 to F4 of the executed function program 2. Which function program 2 is carried out on which control unit 11 can be established, for example, as a function of which further components are still required by the function program 2 so as to provide the vehicle functionality F1 to F4. For example, a function program 2 may require one or more bus ports 23 for communicating with further vehicle components. The bus ports may be for a Controller Area Network (CAN) bus and/or a Local Interconnect Network (LIN) bus, for example. A control unit 11 may also be connected to a camera 14, for example, via which surroundings monitoring or vehicle cabin monitoring is made possible as a vehicle functionality F3. A function program 2 may require a microphone 15, for example, as a data source for microphone data and may be operated on a corresponding control unit 11, to which a microphone 15 is connected. Examples of suitable control units 11 include: a gateway for coupling data networks and/or bus systems of the motor vehicle 1, a driver assistance system, an infotainment system (information and entertainment system), and a vehicle information system.

Even though the function programs 2 are not carried out directly by the communication unit 6 itself, and thus do not have direct access to the wireless links 7 via the wireless modules 8, the function programs 2 have not been specifically adapted to be able to additionally communicate via the data network 12 with the communication unit 2. Instead, a service module 16 is provided in each control unit 11, which manages or controls or configures the data exchange between the respective control unit 11 and the communication unit 6, and onward to the respective vehicle-external object 4. For example, each service module 16 can carry out an authentication and/or encryption for the transmission of the communication data 3. Within each control unit 11, an internal exchange 17 of the communication data 3 takes place between the service module 16 on the one hand and the respective function program 2 on the other hand. In this way, each function program 2 only has to be designed or configured so as to be able to exchange communication data with the service module 16 within a control unit 11.

The service modules 16 may be designed identically in all control units 11, so that a function program 2 can also be alternately executed on two different control units 11. For this purpose, a copy of the respective function program F1 to F4 is then provided in each control unit 11, for example. An arbiter unit 18 can be used to ascertain respective utilization data 19 of the control units 11, which is to say, for example, a processor utilization of the respective processor device 13. The arbiter unit 18 can be a program module of one of the control units 11 or of a further control device, for example. As a function of the utilization data 19, it is then possible to control, by way of the arbiter unit 18, which of the copies of a function program 2 is being launched or operated. In this way, load balancing 20, which is to say equalizing of the utilization of the control units 11, can be achieved. So as to enable a switch between the control units 11, a set of parameters 21 describing the current operating state of the function program can be ascertained for a halted function program 2. A copy of the function program on another control unit 11 can then be configured so as to continue, during the execution thereof, the respective vehicle functionality F1 to F4 where the halted function program 2 stopped.

It is thus made possible in the motor vehicle 1 that vehicle functionalities F1 to F4 are distributed among multiple control devices or control units 11, without the need to adapt the function programs 2 for this purpose, since dedicated service modules 16 of each control unit 11 provide an appropriate communication infrastructure, for example for authentication and/or encryption. As a result of identical software architecture in the control units 11, which is to say overall as a result of the identical nature of the service modules 16, a dynamic distribution of the vehicle functionalities F1 to F4 between the control units 11 during the run time is also possible, so as to thereby enable the described load balancing 20. The dynamic distribution of the vehicle functionalities F1 to F4 takes place during the run time via the arbiter unit 18, which accordingly halts or starts or activates the copies of the function programs 2.

As a result, there are preferably multiple instances (control devices, such as a gateway for communication networks of the motor vehicle, an infotainment system, a driver assistance system), which all include separate core services or service modules 16. The control of the wireless links 7, which is to say the modem function of the wireless modules 8, and the service modules 16 are thus distributed among at least two different control devices or control units 11, or the communication unit 6. Each service module 16 can carry out an authentication and/or identification of the respective function program 2. A control unit 11 can also be implemented or provided, for example, by a portable, mobile terminal coupled to the motor vehicle 1, for example a smart phone or a tablet PC.

As a result of the load balancing 20, the distribution of the function programs 2 can be adapted to the differing computing powers of the control units 11. Due to the identical design of the service modules 16 and the operating systems for executing the function programs 2, the function programs 2 can also be subsequently executed on free selectable control units 11.

Overall, the example demonstrates how it is possible, as a result of the invention, to provide a decentralized connected car architecture by way of one communication unit and multiple control units, and to carry out load balancing by an arbiter unit.

The invention claimed is:

1. A motor vehicle, comprising:
 a communication unit comprising at least one wireless module configured to operate a respective wireless link, using the at least one wireless module, to at least one vehicle-external object for an exchange of communication data;
 a plurality of function programs, each one of the plurality of function programs configured to provide a vehicle functionality that is based on the communication data; and
 a plurality of control units, different from the communication unit, and comprising the plurality of function programs,
 wherein each one of the plurality of control units includes a service module configured, independently of the plurality of function programs, to exchange the communication data from a respective control unit via the communication unit and the respective wireless link with the at least one vehicle-external object, and configured to provide all those service functions that are required for the exchange of the communication data with the at least one vehicle-external object,
 wherein the plurality of function programs are configured to exchange the communication data only with a respective service module of the respective control unit, and
 wherein a unit-external communication from the respective control unit to the at least one vehicle-external object is provided by the respective service module.

2. The motor vehicle according to claim 1, wherein the service modules of the plurality of control units are designed identically so that a function program is alternately executed on two different control units.

3. The motor vehicle according to claim 1, wherein the service modules are configured to perform at least one of an authentication for the plurality of function programs with the at least one vehicle-external object, an encryption of the communication data to be transmitted, or a decryption of received communication data.

4. The motor vehicle according to claim 1, wherein a respective copy of one function program is provided in at least two of the plurality of control units, and the at least two of the plurality of control units are configured to each operate one of the copies at a time.

5. The motor vehicle according to claim 4, wherein the at least two of the plurality of control units are configured to:
 halt one of the copies during ongoing operation for a change from one of the at least two of the plurality of control units to another one of the at least two of the plurality of control units,
 ascertain a set of parameters, which describes a current operating state of the halted copy,
 set an operating state in the other one of the copies using the set of parameters, and
 put the other one of the copies into operation.

6. The motor vehicle according to claim 5, further comprising:
 an arbiter unit configured to ascertain a respective resource utilization level of the at least two of the plurality of control units and to equalize the resource utilization levels by the change from the one of the at least two of the plurality of control units to the other one of the at least two of the plurality of control units.

7. The motor vehicle according to claim 1, wherein the vehicle functionalities comprise at least one of navigation, voice control, processing of sensor signals, car-2-X communication, or remote maintenance.

8. The motor vehicle according to claim 1, wherein the at least one wireless module comprises at least one of a mobile communication module, a Wireless Local Area Network (WLAN) module, or a Bluetooth module.

9. The motor vehicle according to claim 1, wherein the communication unit and the plurality of control units are coupled to one another via a packet-oriented data network.

10. A method for operating a plurality of vehicle functionalities, which are based on communication data exchanged with at least one vehicle-external object, in a motor vehicle, the method comprising:
 operating, using at least one wireless module of a communication unit, a respective wireless link to the at least one vehicle-external object;
 providing, using a plurality of function programs, the plurality of vehicle functionalities;
 operating, using each one of a plurality of control units that are different from the communication unit, a service module;
 exchanging, using the service module and independently of the plurality of function programs, the communication data from a respective control unit, via the communication unit and the respective wireless link, with the at least one vehicle-external object; and
 providing all those service functions that are required for the exchange of the communication data with the at least one vehicle-external object,
 wherein the plurality of function programs are distributed among the plurality of control units and exchange the communication data only with a respective service module of the respective control unit, and
 wherein a unit-external communication from the respective control unit to the at least one vehicle-external object is carried out by the respective service module.

11. The method according to claim 10, wherein the service modules of the plurality of control units are designed identically, and the method further comprising:
 alternately executing a function program on two different control units.

12. The method according to claim 10, further comprising:
 performing, using the service modules, at least one of an authentication for the plurality of function programs with the at least one vehicle-external object, an encryption of the communication data to be transmitted, or a decryption of received communication data.

13. The method according to claim 10, further comprising:
 providing a respective copy of one function program in at least two of the plurality of control units; and
 operating, using each one of the at least two of the plurality of control units, one of the copies at a time.

14. The method according to claim 13, further comprising:
- halting, using the at least two of the plurality of control units, one of the copies during ongoing operation for a change from one of the at least two of the plurality of control units to another one of the at least two of the plurality of control units;
- ascertaining, using the at least two of the plurality of control units, a set of parameters, which describes a current operating state of the halted copy;
- setting, using the at least two of the plurality of control units, an operating state in the other one of the copies using the set of parameters; and
- putting, using the at least two of the plurality of control units, the other one of the copies into operation.

15. The method according to claim 14, further comprising:
- ascertaining, using an arbiter unit, a respective resource utilization level of the at least two of the plurality of control units and to equalize the resource utilization levels by the change from the one of the at least two of the plurality of control units to the other one of the at least two of the plurality of control units.

16. The method according to claim 10, wherein the vehicle functionalities comprise at least one of navigation, voice control, processing of sensor signals, car-2-X communication, or remote maintenance.

17. The method according to claim 10, wherein the at least one wireless module comprises at least one of a mobile communication module, a Wireless Local Area Network (WLAN) module, or a Bluetooth module.

18. The method according to claim 10, further comprising:
- coupling the communication unit and the plurality of control units using a packet-oriented data network.

* * * * *